(12) United States Patent
Leonhardt et al.

(10) Patent No.: US 8,753,030 B2
(45) Date of Patent: Jun. 17, 2014

(54) MOUNTING KNUCKLE

(75) Inventors: Michael P. Leonhardt, Castaic, CA (US); Glenn M. Tyson, La Crescenta, CA (US)

(73) Assignee: U.S.T.E., Inc., Simi Valley, CA (US)

( * ) Notice: Subject to any disclaimer, the term of this patent is extended or adjusted under 35 U.S.C. 154(b) by 13 days.

(21) Appl. No.: 13/546,277

(22) Filed: Jul. 11, 2012

(65) Prior Publication Data

US 2013/0228658 A1 Sep. 5, 2013

Related U.S. Application Data

(60) Provisional application No. 61/605,708, filed on Mar. 1, 2012.

(51) Int. Cl.
*E04G 3/00* (2006.01)

(52) U.S. Cl.
USPC ............... 403/114; 248/288.31; 248/276.1; 403/78; 403/90

(58) Field of Classification Search
USPC ........ 248/274.1, 276.1, 282.1, 284.1, 288.31, 248/291.1, 296.1; 403/76, 77, 78, 90, 114, 403/115, 122, 124, 125, 126, 127, 128, 131, 403/141, 142
See application file for complete search history.

(56) References Cited

U.S. PATENT DOCUMENTS

| | | | | |
|---|---|---|---|---|
| 4,545,555 A | * | 10/1985 | Koch | 248/280.11 |
| 5,109,321 A | * | 4/1992 | Maglica et al. | 362/191 |
| 6,814,473 B2 | * | 11/2004 | Chen | 362/402 |
| 7,674,063 B2 | * | 3/2010 | Jan et al. | 403/145 |
| 7,861,508 B2 | * | 1/2011 | Murayama et al. | 59/78.1 |
| 8,086,278 B2 | * | 12/2011 | Li et al. | 455/569.1 |
| 8,246,266 B2 | * | 8/2012 | Lang et al. | 403/87 |

* cited by examiner

*Primary Examiner* — Alfred J Wujciak
(74) *Attorney, Agent, or Firm* — Novak Druce Connolly Bove + Quigg LLP

(57) ABSTRACT

A knuckle assembly for mounting an electrical device includes a rotatable knuckle mount, an articulated knuckle and an electrical device mount. Two knuckle elements forming the articulated knuckle each include an open cavity, which together form a closed cavity. One of the knuckle elements is pivotally attached to the rotatable knuckle mount and the other includes the electrical device mount. A grommet is positioned in the closed cavity; and a fastener engages the knuckle elements and extends through the grommet. The grommet includes spherical or spheroidal segments complementary to the inner surfaces of the closed cavity and in interfering fit when assembled. The grommet is in non-rotational engagement with one of the knuckle elements. Wires extend through the grommet adjacent a central through hole. A fastener extending through the central through hole draws the knuckle elements together to fix the grommet and seal the assembly.

15 Claims, 2 Drawing Sheets

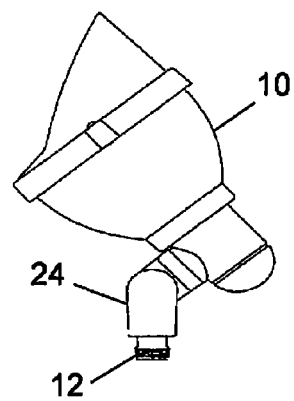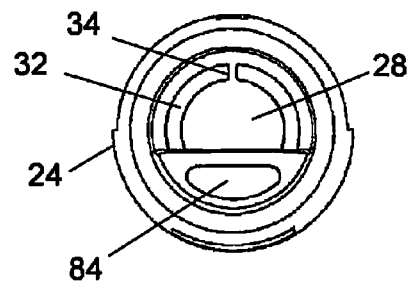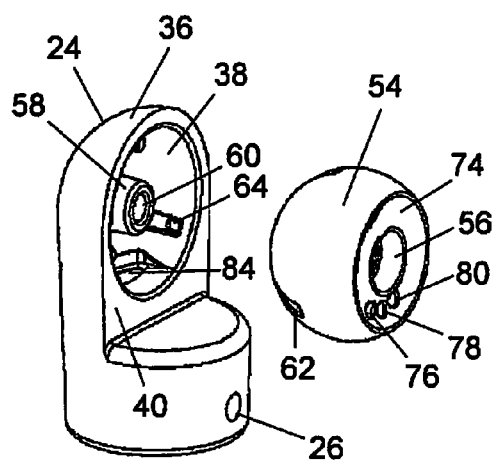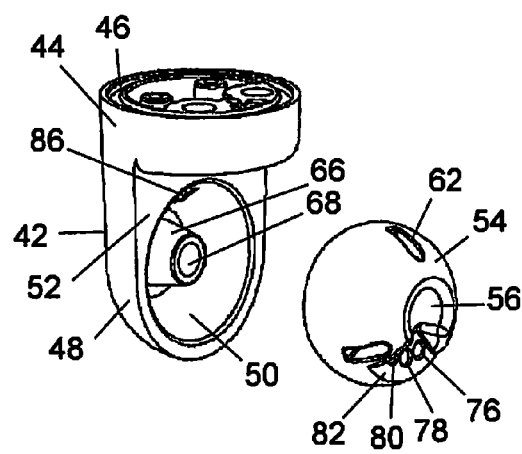
Fig. 1
Fig. 5
Fig. 3
Fig. 4

MOUNTING KNUCKLE

This application claims priority based on Provisional Application 61/605,708, filed Mar. 1, 2012, the disclosure of which is incorporated by reference in its entirety.

BACKGROUND OF THE INVENTION

The field of the present invention is adjustable mounts for electrical devices.

Landscape lighting fixtures have traditionally been faced with significant challenges in precise aiming of such fixtures. Adjustment devices used to aim the fixtures must endure the rigors of being mounted in the ground where abuses from maintenance, fertilizer, water, mud, debris, vandalism, and weather extremes are commonplace. Furthermore, the mechanisms commonly are asked to articulate in multiple axes, along with being capable of routing electrical wires through the articulation. This challenge is compounded when water tightness is a requirement.

Existing mechanisms used to mount, adjust and aim these types of fixtures include knuckle joint assemblies and yoke or stirrup assemblies. Knuckle joint assemblies are comprised of two mating halves fixed about a central pivot point. This pivot point usually is a screw which, when tightened, locks the two halves together. Knuckle joint assemblies are affixed to the lighting fixture at a single point. Electrical supply is commonly routed through the knuckle joint assembly. To avoid loss of alignment, intermeshed teeth on mating halves have been used. The fineness of the meshed teeth determine aimability of the fixture. Tapered conical mating features also have been used to eliminate the indexing of the aiming limitations inherent with using teeth. Conical tapers rely solely on friction to overcome rotational forces, but can become frozen in place.

Routing wiring through the single pivot knuckle assembly usually results in chafing of the wiring. Because knuckles tend to be relatively small, tight spacing magnifies the chafing. Shorting of the wring is commonplace in this area and is usually a mode of failure for this type of fixture. Twisting of the wiring around the pivot point screw is another issue with electrical pass through routing. Adjustments where the fixture is articulated about the centerline of the knuckle stem also strains the electrical supply connections. This adjustment is generally accomplished through a standard male threaded pipe stem assembled into a female threaded hub opening. If aiming requires the position of the fixture to be different than where the male/female joint tightens, the stem can remain loose.

Knuckle joint assemblies usually have no provision to block water entry directly into the fixture from the electrical pathway. Seals such as O-rings are often damaged or crushed as the fixture is adjusted. Wiring routed into the fixture is loose and openings allowing the electrical entry into the fixture body are generally not sealed.

Yoke or stirrup type assemblies are typically affixed to the lighting fixture at two pivot points located along an axis about which the fixture pivots. Adjustment is effected when the two pivot point mechanisms are loosened, the fixture aimed, then the two pivot point mechanisms are tightened. There is typically no provision for internal electrical routing. The electrical penetration into the fixture housing must be done separately which adds another point of water entry and does not allow for clean second axis rotation. Further, the electrical connections are accessible and, therefore, subject to exposure and vandalism. If rotation and electrical supply pass through are combined at one point, that point requires separate sealing as well as a mechanism for locking the position of the fixture.

SUMMARY OF THE INVENTION

The present invention is directed to a knuckle for mounting an electrical device. The knuckle includes a rotatable knuckle mount and an electrical device mount. Two knuckle elements each include an open cavity, which together form a closed cavity. One of the knuckle elements is pivotally attaching to the knuckle mount and the other includes the electrical device mount. A grommet is positioned in the closed cavity; and a fastener engages the knuckle elements and extends through the grommet.

In a first aspect of the present invention, one of the knuckle elements has an inner surface of rotation about an axis perpendicular to the axis of the knuckle mount, which surface is a segment of a sphere or spheroid. The grommet includes an outer surface of rotation about the axis of the inner surface of rotation in that one knuckle element. The inner and outer surfaces of rotation are complementary with an interfering fit. The grommet is in non-rotational engagement with the other of the knuckle elements. The grommet provides infinite adjustability within the arc of motion of the knuckle. In compression, the grommet seals and locks the knuckle over the area of the segment and can more readily be released later from locking engagement.

In a separate second aspect of the present invention, one of the knuckle elements has an inner surface of rotation about an axis perpendicular to the axis of the knuckle mount, which surface is a segment of a sphere or spheroid. The grommet includes an outer surface of rotation about the axis of the inner surface of rotation in that one knuckle element. The inner and outer surfaces of rotation are complementary with an interfering fit. The grommet is in non-rotational engagement with the other of the knuckle elements. Wiring extends through the closed cavity and, in that closed cavity, through wire holes in the grommet. The grommet is truncated for wiring clearance; and a shoulder surrounds the fastener to protect the wiring. The grommet provides infinite adjustability within the arc of motion of the knuckle. In compression, the grommet seals and locks the knuckle over the area of the segment, seals the wiring in the wire path and can more readily be released from locking engagement.

In a separate third aspect of the present invention, the device of the first two aspects of the invention is enhanced by the other of the knuckle elements also having an inner surface which is a segment of a sphere or spheroid and by the grommet including an outer surface which is complementary to the adjacent inner surface. Wire holes through the grommet can be compressed by the interference fit impacting the full length of the wire holes to seal the wire path between knuckle elements.

In a separate fourth aspect of the present invention, any of the foregoing aspects may be combined to further advantage.

Accordingly, it is an object of the present invention to provide an improved mounting knuckle. Other and further objects and advantages will appear hereinafter.

BRIEF DESCRIPTION OF THE DRAWINGS

FIG. 1 is a side view of a mounting knuckle with an electrical device mounted thereon.

FIG. 3 is an exploded perspective view of a first knuckle element and grommet.

FIG. 4 is a perspective view of a second knuckle element and grommet.

FIG. 5 is a bottom view of the first knuckle element.

DETAILED DESCRIPTION OF THE PREFERRED EMBODIMENT

Figure 6:
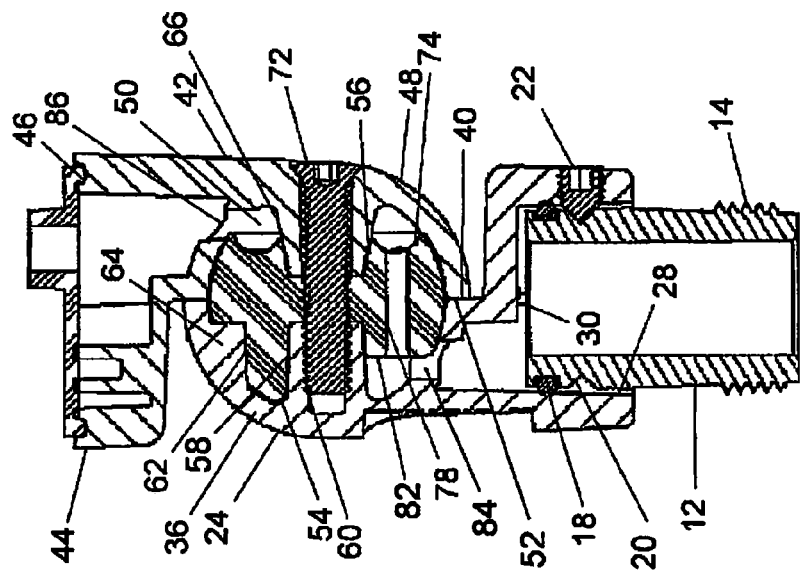
FIG. 6 is a cross-sectional side view of the assembled knuckle.
Figure 2:
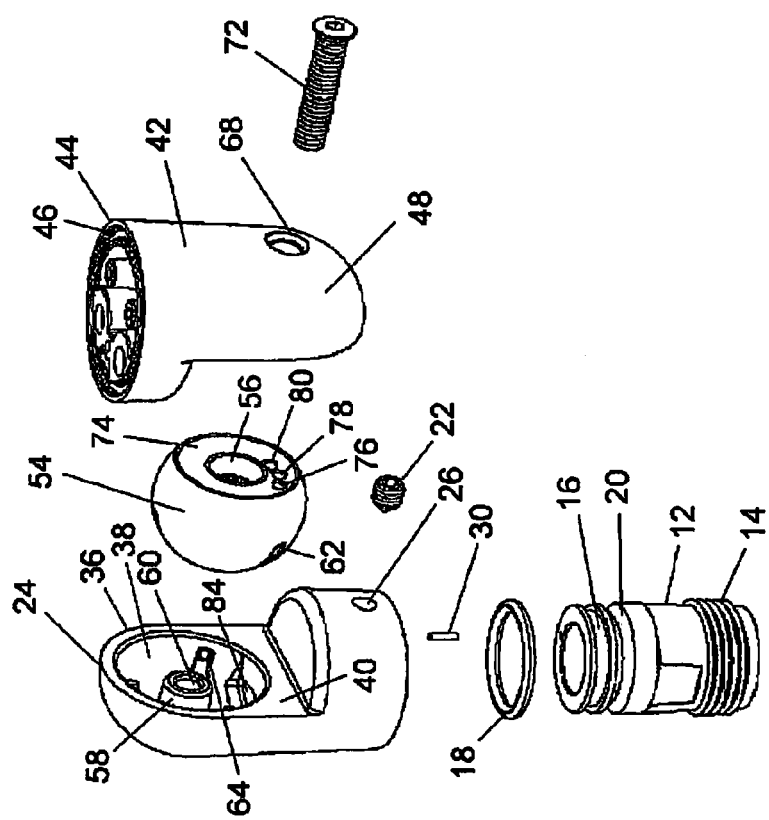
FIG. 2 is an exploded perspective view of the mounting knuckle.

Turning in detail to the drawings, a knuckle for mounting electrical devices such as lamps 10 is disclosed. A knuckle mount 12 is shown to be substantially cylindrical with a passageway therethrough and threads 14 for engagement with an electrical connection supply box (not shown). The knuckle mount 12 typically extends with the axis therethrough in a vertical orientation to just above the ground in an outdoor environment. A seal groove 16 about the circumference of the mount 12 is sized to receive an O-ring seal 18. A locking groove 20 is arranged to receive a set screw 22 upon assembly.

A first knuckle element 24 is rotatably mounted on the knuckle mount 12. The set screw 22 is threaded into the locking groove 20 through a threaded hole 26. The set screw 22 may be placed to simply retain the knuckle element 24 from separating from the knuckle mount 12 or be tightened to restrain the knuckle element 24 from rotating on the knuckle mount 12. The O-ring seal 18 is sized to seal between the mounting cavity 28 of the knuckle element 24 and the seal groove 16. A pin 30 is engaged with the top annular surface of the knuckle mount 12 to extend into the mounting cavity 28 and into a channel 32 in the mounting cavity 28. The channel 32 has a stop 34 to prevent the knuckle element 24 from rotating a full 360□ or more on the knuckle mount 12 to prevent wiring extending through the interior of the knuckle mount 12 from becoming excessively twisted.

The knuckle element 24 includes an upstanding structural cup 36. A first cavity 38 is defined within the structural cup 36. In the preferred embodiment, the cavity 38 is generally hemispherical with an opening at an engagement plane 40.

A second knuckle element 42 has a cylindrical mount 44 with appropriately placed threaded holes to receive an electrical device such as the lamp 10. A gasket is shown on the cylindrical mount 44 in FIG. 6 engaging with a groove 46 around the inner perimeter of the cylindrical mount 44. The knuckle element 42 also has a structural cup 48. The cup 48 defines a cavity 50 which, in the preferred embodiment, is also generally hemispherical. The cavity also opens at an engagement plane 52.

Looking to the orientation of the knuckle, the knuckle mount 12 rotationally mounts the knuckle about a first axis. This axis extends along the engagement planes 40, 52 when assembled. A second axis through the cavities 38, 50 may be defined perpendicular to the rotational axis of the knuckle mount 12 and perpendicular to the engagement planes 40, 52. When the engagement planes 40, 52 are engaged with the open cavities 38, 50 aligned, a closed cavity is defined which is generally spheroidal or spherical.

A generally spherical grommet 54 made of elastomeric material is positioned within the closed cavity defined by the open cavities 38 and 50 when the knuckle elements 24, 42 are positioned together. The grommet 54 has a central hole 56 to extend along the perpendicular axis. The central hole 56 is shaped to receive a tapered shoulder 58 which extends centrally in the open cavity 38. The shoulder 58 has a central threaded hole 60. The grommet 54 also has three engagement slots 62 equiangularly spaced about the surface of the grommet 54 which is received by the cavity 38. The three engagement slots 62 extend in line with the central hole 56 to receive engagement fins 64 in the first cavity 38.

The central hole 56 is also formed to receive a tapered shoulder 66 with a through hole 68 in the shoulder 66 extending in the open cavity 50. The shoulder 66 is located along the perpendicular axis in the open cavity 50. The through hole 68 extends through the wall of the structural cup 48. Upon assembly, a fastener 72 extends through the through hole 68, the central hole 56 of the grommet 54 and into the threaded hole 60. The fastener 72 may be drawn in by threaded engagement with the hole 60 to bring the knuckle elements 24 and 42 together at the engagement planes 40, 52. When together, the tapered shoulders 58, 66 do not touch in this embodiment. Thus, the grommet 54 can compress against the fastener 72 to provide sealing along the central hole 56 of the grommet 54 between the shoulders 58, 66.

The grommet 54 is truncated about the central hole 56 on the portion extending into the cavity 50 of the knuckle element 42. This truncation 74 relieves the grommet 54 from extending fully to the depth of the open cavity 50. The truncation 74 provides wiring clearance around the fastener 72 located within the shoulder 66.

Wire holes 76, 78, 80 extend parallel to the central hole 56 through the grommet 54. At one end, the holes 76, 78, 80 terminate at the truncation 74. At the other end, the wire holes 76, 78, 80 terminate at a clearance notch 82. The clearance notch 82 aligns with a supply conductor channel 84. The channel 84 provides a wire passageway from the mounting cavity 28 into the open cavity 38 for access to the wire holes 76, 78, 80. A similar wire passageway 86 extends through the cylindrical mount 44. Wiring through the wire holes 76, 78, 80 circumvents the fasteners 72 to extend through the wire passageway 86 to an electrical mounted device such as the lamp 10. The shoulder 66 about the fastener 72 protects the wiring from the abrasive fastener threads. Thus, a first wire passageway 84 extends through the knuckle element 24 into the cavity 38 from the knuckle mount 12. The wiring then extends through the wire holes 76, 78, 80 to the clearance provided by the truncation 74 of the grommet 54. The wiring then extends around the shoulder 66 and through a wire passageway 86 to the electrical device.

In operation, the knuckle is associated with the knuckle mount 12 with the O-ring seal 18 in place. The set screw 22 is engaged with the locking groove but preferably not tightened until final aiming is performed. The grommet 54 is positioned in the cavity 38 with the engagement slots 62 receiving the engagement fins 64. The clearance notch 82 is arranged to be adjacent the supply conductor channel 84. Preferably wiring has been threaded through the wire holes 76, 78, 80 before such placement of the grommet 54 in the first cavity 38. With the engagement of the fins 64 in the slots 62, the grommet 54 is in a non-rotational engagement with the open cavity 38. The grommet 54 has an outer surface which is a spheroidal or spherical segment complementary to the spheroidal or spherical segment of the inner surface of the cavity 38 in the knuckle element 24. The grommet 54 may seat snuggly within the cavity 38 with a nominal outer radius of the grommet equal to the nominal inner radius of the cavity 38 when the elements are spherical.

The wiring extending through the grommet 54 from the truncation 74 is threaded through the wire passageway 86 to the cylindrical mount 44. The knuckle element 42 is then positioned with the open cavity 50 over the grommet 54. Again, the surface of the cavity 50 defines the segment of a spheroid or sphere to engage with the outer surface of the grommet 54 also defining a spheroidal or spherical segment. However, the grommet 54 and the knuckle element 42 do not fully mate because of an interference fit of the grommet 54 within the cavity 50. With a nominal radius of the spherical cavity 50 of 0.625 inches, the spherical grommet 54 advantageously has a nominal radius of 0.635 inches. The shore hardness of the spherical grommet 90 A+/−5.

The fastener 72 is then threaded through the hole 68 into the central hole 56. Aiming adjustments are made and the fastener is then tightened to draw the engagement planes 40, 52 together. The grommet 54 is compressed into interference fit within the cavity 50 and is also forced axially along the fastener to fit more tightly in the cavity 38. The spherical or spheroidal grommet 54 segments are distorted with this compression to closely conform and compress against the surface segments of rotation of the interior of the cavities 38, 50. Further, the wire holes 76, 78, 80 are also distorted along their length to conform and compress against wiring extending therethrough. With the knuckle thus assembled, the knuckle element 42 can no longer rotate relative to the grommet 54 which is in turn held from rotating in the knuckle element 24 by the engagement of the fins 64 in the slots 62. Further, the grommet 54 seals between itself and the interiors of the cavities 38, 54 and between the wire holes 76, 78, 80 and the wiring extending therethrough. Thus, in this configuration, the knuckle is fixed and provides sealing with compression of the grommet 54 to either side of the engagement planes 40, 52 with the inner surfaces of the cavities 38, 50. The wiring through the wire holes 76, 78, 80 is also in compression with the compressed grommet 54 to complete sealing of both the wire passageway through the knuckle element 24 and the wire passageway through the knuckle element 42.

An improved mounting knuckle is described above. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A knuckle for mounting an electrical device, comprising a knuckle mount;
    a first knuckle element rotatably mounted on the knuckle mount about a first axis, the first knuckle element including a first open cavity and a first wire passageway from the mount to the first open cavity;
    a second knuckle element including an electrical device mount, a second open cavity and a second wire passageway from the electrical device mount to the second open cavity, the second open cavity having an inner surface of rotation about a second axis perpendicular to the first axis, which is a segment of a sphere or spheroid, the first and second knuckle elements mating together to define a closed cavity from the first and second open cavities;
    a grommet positioned in the closed cavity, the grommet being in non-rotational engagement with the first open cavity, the grommet including an outer surface of rotation about the second axis in the second open cavity, the inner and outer surfaces of rotation being complementary with an interfering fit;
    a fastener extending along the second axis engaging the first and second knuckle elements through the closed cavity, the grommet being drawn into interference fit with the inner surface of rotation.

2. The mounting knuckle of claim 1, wherein the first open cavity has an inner surface with a spherical or spherical segment and engagement fins, the grommet further including a surface in the first open cavity having a complementary spherical segment with engagement slots receiving the engagement fins.

3. The mounting knuckle of claim 1, wherein the grommet further includes a third wire passageway extending along the direction of the second axis between the first and second wire passageways.

4. The mounting knuckle of claim 3, wherein the third wire passageway includes wire holes through the grommet extending adjacent to the second axis.

5. A knuckle for mounting an electrical device, comprising a knuckle mount;
    a first knuckle element rotatably mounted on the knuckle mount about a first axis, the first knuckle element including a first open cavity and a first wire passageway from the mount to the first open cavity;
    a second knuckle element including an electrical device mount, a second open cavity and a second wire passageway from the electrical device mount to the second open cavity, the second open cavity having an inner surface of rotation about a second axis perpendicular to the first axis, which is a segment of a sphere or spheroid, the first and second knuckle elements mating together to define a closed cavity from the first and second open cavities;
    a grommet positioned in the closed cavity, the grommet being in non-rotational engagement with the first open cavity, the grommet including an outer surface of rotation about the second axis in the second open cavity and wire holes through the grommet extending adjacent to the second axis, the inner and outer surfaces of rotation being complementary with an interfering fit;
    a fastener extending along the second axis engaging the first and second knuckle elements through the closed cavity, the grommet being drawn into interference fit with the inner surface of rotation and the wire holes being constricted around wiring when the fastener is tightened, the grommet being truncated in the second open cavity to provide wiring clearance within the second open cavity around the fastener, the second knuckle element further including a shoulder extending inwardly about the fastener in the wiring clearance.

6. The mounting knuckle of claim 5, wherein the inner surface of rotation and the outer surface of rotation are spherical or spheroidal segments.

7. The mounting knuckle of claim 5, wherein the holes between the first and second wire passageways extend along the direction of the second axis and wherein the grommet is truncated in the second open cavity to provide wiring clearance between the second and third wire passageways within the second open cavity around the fastener.

8. A knuckle for mounting an electrical device, comprising a knuckle mount;
    a first knuckle element rotatably mounted on the knuckle mount about a first axis, the first knuckle element including a first open cavity having a first inner surface which is a segment of a sphere or spheroid and a first wire passageway from the mount to the first open cavity;
    a second knuckle element including an electrical device mount, a second open cavity and a second wire passageway from the electrical device mount to the second open cavity, the second open cavity having a second inner surface about a second axis perpendicular to the first axis, which is a segment of a sphere or spheroid, the first and second knuckle elements mating together to define a closed cavity from the first and second open cavities;
    a grommet positioned in the closed cavity, the grommet being in non-rotational engagement with the first open cavity, the grommet including a first outer surface about the second axis in the first open cavity and a second outer surface about the second axis in the second open cavity and wire holes through the grommet extending adjacent to the second axis, the first and second inner and outer surfaces being complementary and in interfering fit with the closed cavity fully closed;

a fastener extending along the second axis engaging the first and second knuckle elements through the closed cavity, the grommet being drawn into interference fit with the first and second inner surfaces and the wire holes being constricted around wiring when the fastener is tightened.

9. The mounting knuckle of claim 8, wherein the grommet is truncated in the second open cavity to provide wiring clearance within the second open cavity around the fastener.

10. The mounting knuckle of claim 9, wherein the second knuckle element further includes a shoulder extending inwardly about the fastener in the wiring clearance.

11. The mounting knuckle of claim 8, wherein the first open cavity has engagement fins on the first inner surface and the grommet surface in the first open cavity has engagement slots receiving the engagement fins.

12. A knuckle for mounting an electrical device, comprising a knuckle mount;

a first knuckle element rotatably mounted on the knuckle mount about a first axis, the first knuckle element including a first open cavity and a first wire passageway from the mount to the first open cavity;

a second knuckle element including an electrical device mount, a second open cavity and a second wire passageway from the electrical device mount to the second open cavity, the second open cavity having an inner surface of rotation about a second axis perpendicular to the first axis, which is a segment of a sphere or spheroid, the first and second knuckle elements mating together to define a closed cavity from the first and second open cavities;

an elastomeric grommet positioned in the closed cavity, the elastomeric grommet being in non-rotational engagement with the first open cavity, the elastomeric grommet including an outer surface of rotation about the second axis in the second open cavity and a third wire passageway between the first and second wire passageways and extending along the direction of the second axis, the inner and outer surfaces of rotation being complementary with an interfering fit;

a fastener extending along the second axis engaging the first and second knuckle elements through the closed cavity, the elastomeric grommet being drawn into interference fit with the inner surface of rotation.

13. The mounting knuckle of claim 12, wherein the grommet is truncated in the second open cavity to provide wiring clearance between the second and third wire passageways within the second open cavity around the fastener.

14. The mounting knuckle of claim 12, wherein the third wire passageway includes wire holes through the grommet extending adjacent to the second axis, the wire holes being constricted around wiring when the fastener is tightened.

15. The mounting knuckle of claim 12, wherein the first open cavity has an inner surface with engagement fins, the elastomeric grommet further including a surface in the first open cavity having a complementary surfaces with engagement slots receiving the engagement fins.

* * * * *